Sept. 15, 1970  S. N. BOBO ET AL  3,529,121
WELDING APPARATUS
Filed April 3, 1967  3 Sheets-Sheet 1
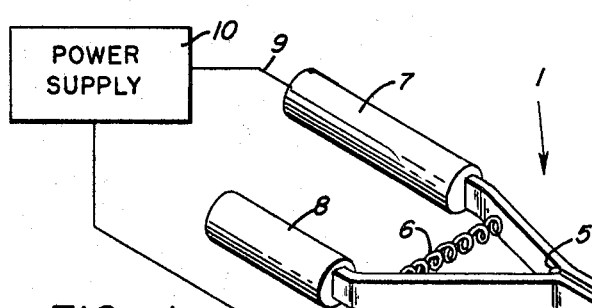
FIG. 1
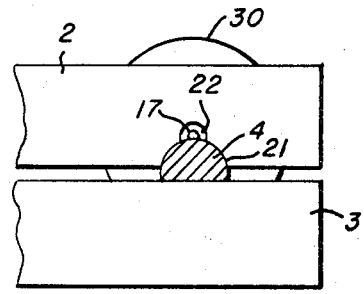
FIG. 3
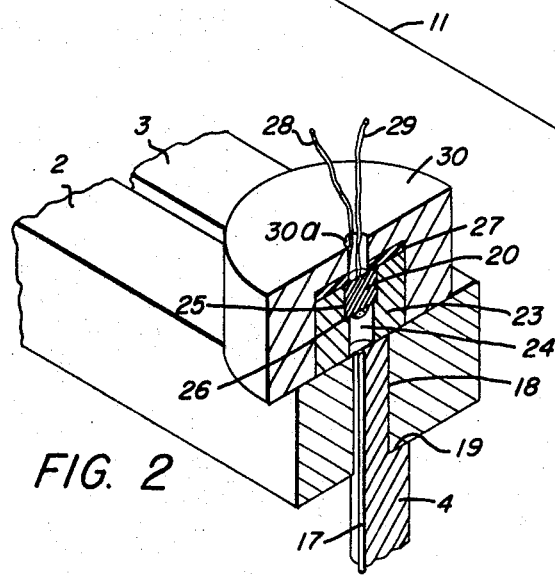
FIG. 2
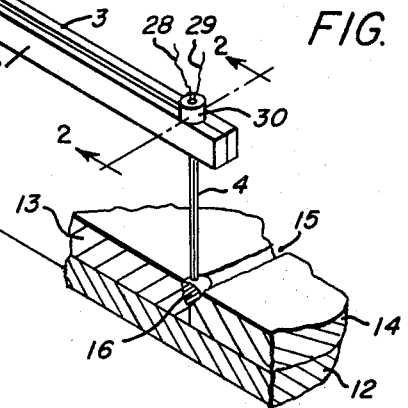
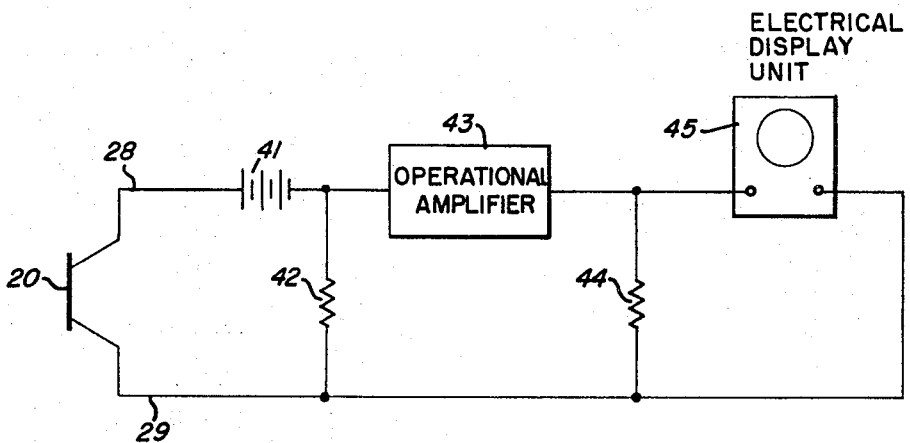
FIG. 4
INVENTORS
STEPHEN N. BOBO
RICARDO VANZETTI
BY
AGENT

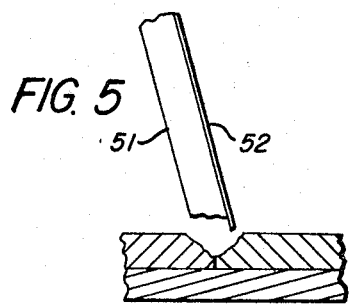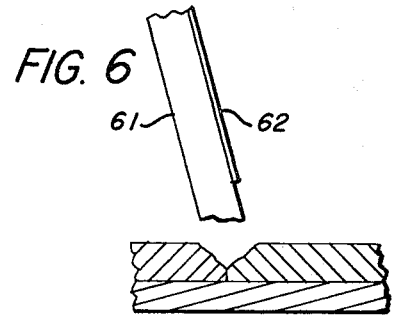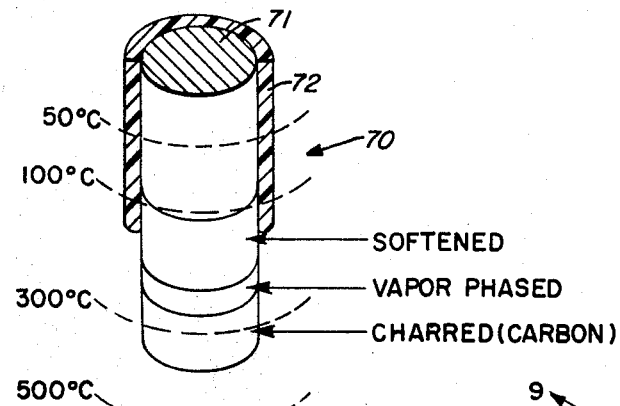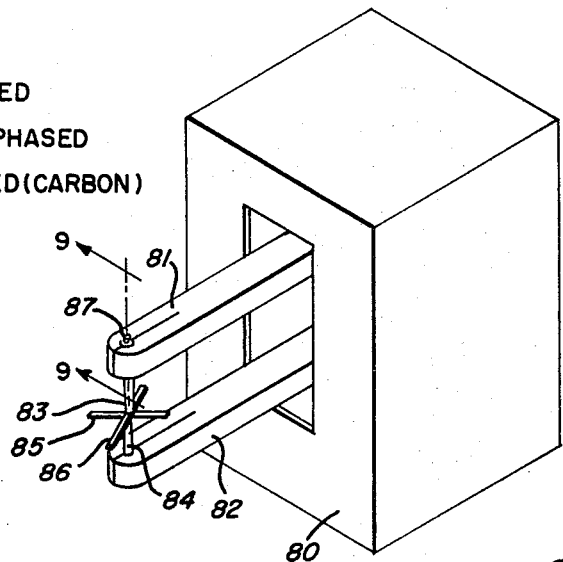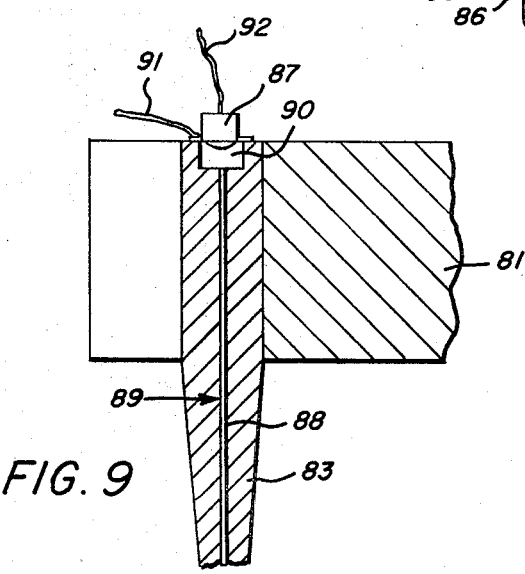

Sept. 15, 1970     S. N. BOBO ET AL     3,529,121
WELDING APPARATUS
Filed April 3, 1967     3 Sheets-Sheet 3
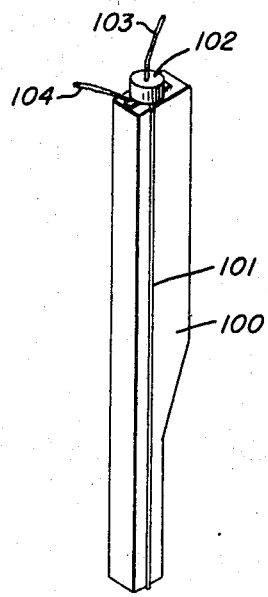
FIG. 10
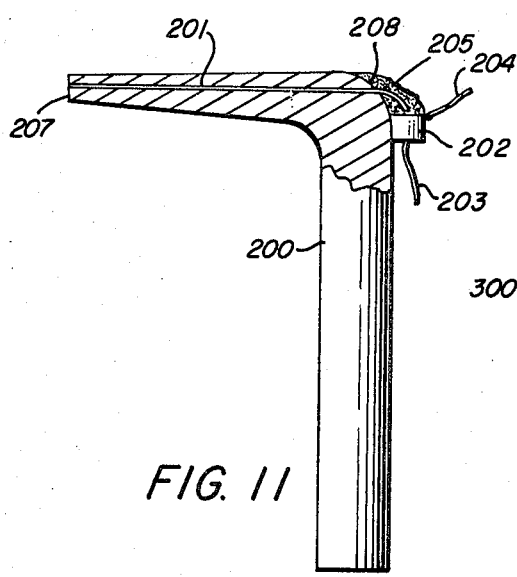
FIG. 11
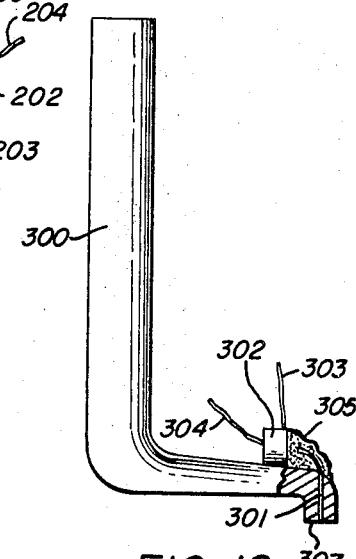
FIG. 12
FIG. 13
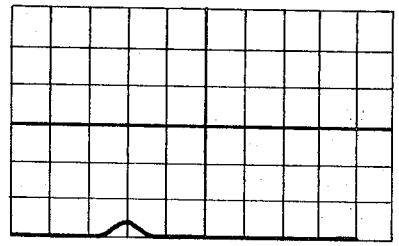
COLD
FIG. 14
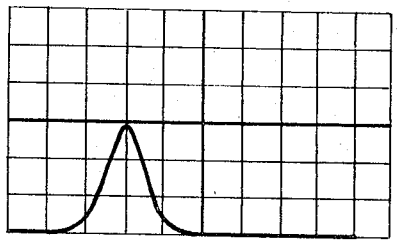
NORMAL
FIG. 15
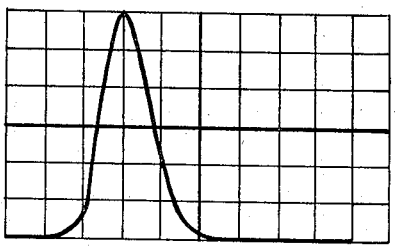
HOT
INVENTORS
STEPHEN N. BOBO
RICARDO VANZETTI
BY *signature*
AGENT United States Patent Office 3,529,121
Patented Sept. 15, 1970

3,529,121
WELDING APPARATUS
Stephen N. Bobo, Cohasset, and Ricardo Vanzetti, Walpole, Mass., assignors to Raytheon Company, Lexington, Mass., a corporation of Delaware
Filed Apr. 3, 1967, Ser. No. 628,058
Int. Cl. B23k 11/00
U.S. Cl. 219—109
19 Claims

ABSTRACT OF THE DISCLOSURE

An infra-red radiation conduit having one end located adjacent a source of heat which causes a section at the end of the conduit to become optically degraded and to itself emit radiation corresponding in intensity to the temperature of the heat source, which emitted radiation is transmitted by the remainder of the conduit to the opposite end located adjacent and directed toward a temperature measuring device.

BACKGROUND OF THE INVENTION

This invention relates to temperature measuring apparatus and in particular to an apparatus which utilizes infra-red radiation to determine the temperature of a heat source.

When material is heated, near-infra-red radiation is emitted from the material. As the temperature of the material increases, the emission wavelength decreases toward the visible region and the material becomes incandescent. It is, therefore, possible to measure the temperature of heated material with satisfactory repeatability by measuring the intensity of the energy emitted during the heat cycle.

Prior art discloses the use of crystalline, rod-shaped material as a conduit for transmitting infra-red radiation from a source to a sensing device. Sapphire is mentioned most often as the preferred material for the rod-shaped conduit, because of its high melting point and its high index of refraction. However, sapphire has many limitations, among them being expense and extreme difficulty of manufacturing as a long, homogeneous rod. One obvious disadvantage to using a crystalline rod as a radiation conduit is that the rod cannot be bent very easily so as to avoid obstructions or to conform to structural contours in close places.

Prior art also discloses the use of an optical lens system as a means of transmitting infra-red radiation from a source to a sensing device. One of the difficulties encountered when using an optical lens system to monitor a heating process is that the lens system focuses on a moderately small area, such as the tip of welding electrodes. A small movement of a work piece, which might be caused by the spring inherent in an L-shaped welding electrode, for example, could move the welded area of the work piece out of focus with the optical lens system. Thus, the thermal information transmitted by the lens system to the sensing device would be inaccurate and would result in a deceptive deviation from the true temperature of the weld. Another objection to the use of an optical lens system in a radiometer of this type is that some of the radiant energy is reflected by the lens surfaces instead of being transmitted to the sensing device. This deficiency in transmitted energy when related to a welding process could lead to an erroneous conclusion about the temperature and the quality of the weld. If multiple reflections occur between the lens surfaces and the radiating surface, the resulting temperature measurements would be even more confusing.

The radiometers disclosed in the prior art are viewing systems. That is, there is an intervening space or field of view between the radiometer and the radiating surface. Some of the difficulties experienced when using a radiometer to view the heating process are interference of foreign objects in the field of view, difficulty in positioning the radiometer near the heated material, and interference of the radiometer with the operation and maintenance of the heating apparatus. However, one main disadvantage to using a radiometer to view a surface of the heated material is that the radiometer transmits both the radiation emitted by that surface and the radiation reflected by that surface. Only the former is indicative of the temperature of the material being heated.

The reflecting power of a surface is expressed in a quantity known as its reflectivity, and the radiating power of a surface is expressed in a quantity known as its emissivity. It can be shown that the two quantities are mutually dependent on each other by the relationship: the emissivity of a surface is equal to one minus the reflectivity of that surface. Thus, if a surface is highly reflective, it is a poor radiating surface and vice versa. If a radiometer is viewing a highly reflective surface of a material that is being heated, most of the radiation received by the radiometer will be reflected energy which is indicative of the temperature of the environment surrounding the reflective surface. If the emissivity of the surface were known, it would be possible to determine that part of the energy received by the radiometer which is radiant energy. However, the relationship between emissivity and reflectivity indicates that emissivity is dependent upon the reflectivity of the surface. The reflectivity, in turn, is dependent upon the composition, smoothness and cleanliness of the surface. Because surface smoothness and cleanliness can vary from one sample to another of the same material, the emissivity of most material is either unknown or radically variable. Furthermore, the emissivity of a surface can vary during the heating process because of surface oxidation. Thus, the reflected energy received by the radiometer would be decreasing and the radiant energy received by the radiometer would be increasing during the heating process.

The problem of emissivity of the heated surface is solved by the present invention as well as other difficulties discussed above in connection with the prior art. Hence, in accordance with the present invention there is provided an inexpensive, flexible transmitting means that (a) is continuously "focussed" on the heated material, (b) transmits radiant energy with minimal losses, (c) is independent of surface emissivity, (d) can be readily obtained in various diameter sizes and any length desired and (e) has a low ratio of diameter to length.

SUMMARY OF THE INVENTION

The present invention pertains to the use of an infra-red radiation conduit, such as an optical fiber, for conveying thermal information from a heat source to a measuring device, such as a detector. The temperature of the heat source must be high enough to change the state of a section at the end of the conduit close to the heat source from a transmitting medium to a radiating medium. A suggested embodiment of this invention shows an optical fiber as part of a welding electrode, with one end of the optical fiber brought down to the area of the interface between the electrode and the weld. The end of the optical fiber at the weld heats up to a temperature corresponding to the temperature of the weld and becomes a source of radiation for the optical conduit. The net result is that the temperature being measured at the opposite end of the fiber is in actuality the temperature of the heated end of the fiber itself. After a few welds, this surface becomes uniform and stable from a temperature standpoint, and the radiation transmitted is a precise indication of the weld temperature.

Radiant energy derived from the heat source at one end of the optical fiber travels with minimal losses through this optical conduit because of total internal reflection. It is well known that when radiant energy enters a transmitting medium it will remain within that medium provided that it does not strike a surface of the medium at an angle less than the critical angle. Due to the fact that the index of refraction of the central core of the optical fiber is higher than the index of refraction of the surrounding outer jacket or cladding material, the critical angle of total reflection is very small. Thus, substantially all of the radiant energy entering one end of the optical fiber will pass out the other end onto a radiation detector.

The detector in the suggested measuring circuit produces an electrical signal proportional to the level of intensity of the radiant energy falling upon it. This signal is amplified and displayed by an oscilloscope, voltmeter or other means for displaying or indicating the intensity of the radiation in terms of electrical units. This electrical measurement can be correlated with the temperature of the heat source or with other criteria. For example, the electrical measurement can be correlated with acceptable or rejectable welds by destructive analysis. Once maximum and minimum standards have been determined for electrical measurements, every weld can be monitored, and questionable welds can be identified for analysis. Among the possible utilizations of this capability to instantly monitor the weld temperature, in real time, is that of using the corresponding electrical signal produced by the detector to control the temperature of the weld through an appropriate feedback system.

The use of optical fibers in this application reduces the problems of cost and procurement. Optical fibers are relatively inexpensive and are available in various diameter sizes and in any length desired. There are optical fibers on the market which transmit radiation in the wavelength region corresponding to welding temperatures, for example.

Using an optical fiber as a radiation conduit represents a savings in space, because it has a small cross-sectional area and a low ratio of diameter to length. Since an optical fiber is very flexible, it can be routed to follow structural contours. For example, an optical fiber can follow narrow channels, curve around obstructions and pass through small apertures. In the suggested embodiments shown, making the optical fiber a part of the welding electrode solves the problem of positioning the optical element near the welding process without interfering with the operation and maintenance of the welding apparatus.

Using an optical fiber to monitor a heating process simplifies the optical design requirements. Since an optical fiber is a radiation conduit, it is continuously in "focus" on the heated area of the work piece. Because positioning of the optical fiber is not critical, there is no need to redesign or readjust the optical system for changes in target distance. This advantage also simplifies replacing the optical fiber with another optical fiber of different diameter or different length.

Locating one end of the optical fiber adjacent the heated material not only prevents the interference of foreign objects but also reduces the effect of emissivity. The end of the optical fiber adjacent the heated material is brought up to a temperature corresponding to the temperature of the heated material. In doing so, the optical properties at that end of the optical fiber become degraded somewhat; but, at the same time, that end of the optical fiber becomes the source of radiation for the rest of the optical conduit. The optical fiber no longer conveys radiant information from the heated material, which information may include both reflection data and radiation data; but it now transmits radiation emitted by the heated end of the optical fiber, which has an emissivity known within limits. Since the source of energy for the radiating end of the optical fiber is derived from the heated material, the corresponding radiant energy emitted by the heated end of the optical fiber is an accurate indication of the temperature of the heated material.

BRIEF DESCRIPTION OF THE DRAWINGS

The invention will be described in greater detail in connection with the accompanying drawings, wherein:

FIG. 1 illustrates one embodiment of this invention as applied to additive welding;

FIG. 2 is an enlarged, fragmentary, longitudinal cross-section taken along the line 2—2 of FIG. 1 looking in the direction of the arrows;

FIG. 3 is a bottom view of the outer ends of the clamping jaws with the welding rod and optical fiber being shown in section taken along the plane of the bottom surface of the jaws;

FIG. 4 is a suggested circuit for use in conjunction with this invention;

FIG. 5 illustrates a glass optical fiber bonded to a welding rod which has a lower melting point than the fiber;

FIG. 6 illustrates a glass optical fiber bonded to a welding rod which has a higher melting point than the fiber;

FIG. 7 is an enlarged view of a plastic optical fiber in a temperature gradient environment;

FIG. 8 illustrates one embodiment of this invention as applied to non-additive welding;

FIG. 9 is an enlarged, longitudinal cross-section taken along the line 9—9 of FIG. 8 and looking in the direction of the arrows;

FIGS. 10, 11 and 12 illustrate various electrode configurations with the optical fiber and the detector as part of the electrode; and FIGS. 13, 14 and 15 show typical oscilloscope traces of welding temperature measurements in accordance with the invention.

DESCRIPTION OF THE PREFERRED EMBODIMENTS

Welding may be divided into two categories, namely: additive welding and non-additive welding. Each has physical characteristics which bear on the detection of radiant heat given off during the welding operation.

One method of performing additive welding involves the use of an electrode arc welder. In its simplest form, electrode arc welding comprises a power source with a ground lead clamped to the work and a hot lead clamped to a welding rod. When the end of the weld rod is brought close to the work, an electric arc is struck. The end of the weld rod and the adjacent edges of the metal parts to be joined become molten. Material from the weld rod is added to the molten puddle to form a weld "bead" which fills the gap between the adjacent edges of the metal parts being joined. After cooling, the weld bead which joins the metal parts is composed of material from the weld rod and material from each of the adjacent metal parts. It should be understood that the present invention is not restricted to use with electrode arc welding but may be applied to other types of additive welding equipment, such as acetylene welding, etc.

Non-additive welding comprises joining two adjacent metal surfaces by generating sufficient heat, as in the case of parallel-gap welding, or a combination of heat and pressure, as in the case of resistance welding, to cause the metal parts between the welding electrodes to fuse together at the interface surfaces. Non-additive welding is used in making connections between components in electronic circuits, for example, and has been widely used for micro-circuit connections in computer modules. It should be understood that the present invention is not restricted to use with parallel-gap welding equipment and resistance welding equipment, but also may be applied to other types of non-additive welding equipment, such as spot welding, etc.

There has long been a need for positive and definitive identification of questionable welds. Visual inspection criteria is neither uniform nor dependable. The only meaningful test at the present time is destructive analysis, but this can be done only on a sampling basis. Neither method of inspection guarantees 100% reliability. Measuring the energy radiated during the weld process provides a means of evaluating the quality of the weld on a 100% basis without resorting to destructive analysis or visual inspection.

There is evidence that the temperature at which the weld was made bears a relationship to the tensile strength of the weld. If the heat is too intense, the weld is poor from the standpoint of reduced cross-sectional area. If the heat is too low, the weld is poor because of insufficient bond. The relationship between welding temperature and tensile strength of the weld has been correlated by destructive analysis.

FIG. 1 of the drawing shows an electric-arc welding clamp, designated generally as 1, which has metal jaws 2 and 3 firmly clamped onto welding rod 4 by spring 6 operating mechanically through fulcrum 5 of the clamp. On the spring side of fulcrum 5, jaws 2 and 3 pass through insulated handle grips 7 and 8. Welding rod 4 is connected electrically to the plus side of welding power supply 10 through insulated cable 9 and jaw 3. The grounded or minus side of welding power supply 10 is connected to metal work pieces 13 and 14 through insulated cable 11 and metal grounding plate 12. The adjacent edges of work pieces 13 and 14 are bevelled to form fillet groove 15 which provides a large surface area for weld bead 16 and confines weld bead 16 during its molten state.

In FIG. 2, there is shown an optical fiber 17 which is bonded longitudinally to the external surface of welding rod 4 along its entire length. A commercially available epoxy cement may be used for bonding the optical fiber to the welding rod. Since welding rods are provided with an external jacket of flux, the optical fiber could be bonded to the welding rod simultaneously with the flux. Alternatively, the optical fiber could be bonded to the welding rod prior to the application of the flux so that the optical fiber would be covered over by a layer of flux and protected from abrasion. FIG. 2 shows a flat surface 18 and a shoulder 19 on welding rod 4 which positions the end of optical fiber 17 longitudinally in relation to detector 20.

FIG. 3 shows in clamping jaw 2 a substantially semicircular recess 21 leading into an adjacent semi-circular recess 22 of smaller radius. Recess 21 locates welding rod 4 laterally in welding jaw 2 and positions optical fiber 17 under detector 20, as shown in FIG. 2. The radius of semi-circular recess 22 is larger than that of optical fiber 17 to prevent any damaging pressure from being exerted thereon.

It is not necessary to have the longitudinal axis of optical fiber 17 parallel to the longitudinal axis of welding rod 4, as shown in FIG. 2, since the fiber 17 may even spiral around or be otherwise disposed on welding rod 4 as long as one end of optical fiber 17 is adjacent detector 20. The only requirements when bonding optical fiber 17 to welding rod 4 are shown in FIG. 3; namely, the end of the optical fiber remote from the weld must be bonded diametrically opposite to flat surface 18 and the longitudinal axis of the fiber at the end remote from the weld must be substantially parallel to the longitudinal axis of the rod so as to fit into recess 19 without being pinched between clamping jaws 2 and 3.

Referring again to FIG. 2, detector 20 is shown supported in position by cylindrical housing 23. Longitudinal centerbore 24 of housing 23 terminates in a larger diameter coaxial cavity 25 and thereby forms shoulder 26. Housing 23 is positioned on the upper surface of clamping jaw 2 so that centerbore 24 is in coaxial alignment with recess 22 in clamping jaw 2. Then housing 23 is bonded to clamping jaw 2 with epoxy cement. Detector 20, to be described hereinafter, is contained within cavity 25. Detector 20 is depressed into cavity 25 until it abutts against shoulder 26. Two electrical leads 28 and 29 from detector 20 extend through the central hole of a rubber washer 27 which is located upon the upper surface of detector 20 and housing 21. The diameter of the central hole in washer 27 is less than the outside diameter of the cylindrical epoxy housing of detector 20 so as to retain the detector against shoulder 26. An outer detector housing 30 encloses washer 27, detector 20 and housing 23 and has an aperture 30a through the end wall thereof through which extend the electrical leads 28 and 29 from detector 20. Outer housing 30 is bonded to clamping jaw 2 with epoxy cement (not shown). Jaw 3 is not constrained but is free to move in and out beneath the housings 23 and 30.

FIG. 4 shows a schematic diagram of a suggested circuit for use with this invention. Detector 20 may be a photoresistive device or may be a photo-emissive cell, a photo-conductive cell, a thermocouple, a bolometer or any other device which is responsive to infra-red radiation. Lead 28 from one side of detector 20 is connected to battery 41 and lead 29 connects the other side of detector 20 to load resistor 42. Battery 41 supplies a steady-state current through detector 20 and load resistor 42 which produces a DC bias across detector 20 and a voltage drop across load resistor 42. As shown in FIG. 2, a radiation signal transmitted by the optical fiber will impinge upon the detector. Detector 20 senses the intensity of the radiation signal by a corresponding change in resistance. The variation of resistance in detector 20 produces a corresponding change in voltage drop across load resistor 42. Operational amplifier 43, which is coupled to load resistor 42, amplifies any changes in voltage drop across load resistor 42 and the amplified variations will be impressed across the amplifier output impedance 44. Voltage display unit 45, which may be an oscilloscope, voltmeter or other voltage displaying device, is connected across the amplifier output impedance 44 and indicates the measurement of voltage across it. The measurement displayed in electrical units by the voltage display unit 45 will correspond to the intensity of the radiation signal received by detector 20 from the weld operation.

FIG. 5 indicates the situation that develops when a glass optical fiber 52 is used with a welding rod 51 which has a lower melting point than the glass fiber. As welding rod 51 is melted by the welding arc or flame, optical fiber 52 maintains its relationship to the weld area. Since the end of optical fiber 52 is adjacent the weld area, it is heated to a temperature corresponding to the temperature of the weld. At this temperature, the end of the optical fiber 52 becomes a source of radiation for the remainder of the optical fiber to transmit to the detector. The intensity of the heat required for the weld is the source of energy for the radiating end of the optical fiber. Therefore, the energy radiated from the end of the optical fiber to the detector bears a corresponding relationship to the temperature of the weld.

FIG. 6 indicates the situation that develops when a glass optical fiber 62 is used with a welding rod 61 which has a higher melting point than the glass fiber. As welding rod 61 is consumed in making the weld bead, the end of optical fiber 62 closest to the weld recedes from the weld area by melting away at a steady rate that bears a definite relationship to the temperature of the weld. The end of optical fiber 62 closest to the weld area is molten glass but the remainder of the optical fiber retains its transmitting properties. Because of the radiant energy received from the weld, the molten end of optical fiber 62 becomes a source of infra-red radiation for the remaining length of optical fiber 62 to transmit to the detector. The intensity of the radiant energy emitted by the molten end of optical fiber 62 bears a definite relationship to the temperature of the weld.

FIG. 7 demonstrates the states that develop in a plastic optical fiber when it is used with a welding rod as shown in FIG. 1 and FIG. 2 of this application, when the plastic fiber is of the type having, for example, an acrylic core and a surounding polyethylene coating. However, similar states would develop in plastic optical fibers made from other organic compounds. Therefore, it should be understood that this invention is not restricted to plastic optical fibers having an acrylic core and an outer polyethylene coating.

In a welding operation utilizing a plastic fiber of this type, as the fiber 70 advances into the gradient heat zones of the weld area, the polyethylene coating 72 begins to melt away and the acrylic core 71 begins to soften in the heat zone which has a temperature of approximately 180° C. In the softened state, the acrylic core is still transparent to infra-red radiation. Between 200° C. and 300° C. the acrylic core begins to outgas, leaving substantially only the carbon element of the organic compound. At approximately 300° C., the tip of the plastic optical fiber closest to the weld comprises primarily carbon. Once substantially everything but carbon is eliminated from the organic compound, it becomes stable until it reaches a temperature of approximately 1500° C. In effect then, what the rest of the plastic optical fiber "sees" is an area of hot charred carbon. In the carbonized state, the absorptivity and emissivity at the end of the plastic optical fiber is greatly improved. The plastic optical fiber no longer conveys radiant information from the feld but transmits radiant energy emitted by the carbon tip which has an emissivity known within limits. The radiating area at the end of the optical fiber is closely constrained, and, therefore, the optical fiber transmits accurate information about the temperature of the weld which is adjacent the carbonized tip of the plastic optical fiber.

FIGS. 8 and 9 show the use of this invention in a non-additive welding process. In FIG. 8, resistance-welding head 80 has upper and lower arms designated 81 and 82 respectively. A vertical electrode 83 in upper arm 81 is longitudinally aligned with vertical electrode 84 in lower arm 82. Electrodes 83 and 84 are connected to a suitable power supply (not shown). Upper arm 81 can be raised or lowered in a vertical direction. With the upper arm 81 in the raised position, overlapping work pieces such as wires 85 and 86 are placed on the lower electrode. The upper arm 81 is then lowered until upper electrode 83 is pressing firmly on overlapping wires 85 and 86. The pressure of the upper arm 81 is maintained during the weld process. When upper electrode 83 contacts the work pieces 85 and 86, a current surge passes between the two electrodes 83 and 84. In doing so, it passes through the region of overlapping wires 85 and 86 between the two electrodes 83 and 84. Because the interfacing surfaces between the overlapping wires 85 and 86 present a high resistance to the passage of the high current surge, heat is generated at the interface. The combination of heat and pressure causes the two metal wires to fuse together at the interface surfaces between the two welding electrodes 83 and 84, thus forming a welded joint in that region.

FIG. 9 is an enlarged cross-sectional view taken along line 9—9 of FIG. 8 and shows a tapered, cylindrical electrode 83, commonly used in resistance welding. A longitudinal bore 88 in electrode 83 terminates at the upper end in a larger diameter coaxial cavity 90. An optical fiber 89 runs the entire length of the longitudinal bore 88. That is, one end of the optical fiber is flush with the end surface of electrode 83 that contacts the wires 85 and 86, and the other end of the fiber terminates adjacent the bottom surface of cavity 90. Cavity 90 is made to a depth sufficient to accommodate a detector 87 which is bonded therein in any suitable manner as by any commercially available epoxy cement. The two electrical leads 91 and 92 from detector 87 may be connected as shown in the schematic circuit diagram of FIG. 4, for example. Again, it is not necessary to use a photoresistive detector since other radiation-responsive devices, such as photoemissive cells, photo-conductive cells, thermocouples, bolometers, etc., will perform equally well with this invention.

When the electrode holding the optical fiber is brought down onto the surface of the material to be welded, the end of the optical fiber that is flush with the welding surface of the electrode is in direct contact with the material being heated and loses its optical quality due to the combination of heat and pressure. However, after a few welds it becomes uniform and stable in temperature.

Since the end of the optical fiber is pressed directly against the material being heated to weld temperature, that end of the optical fiber becomes heated also. It becomes the source of radiation for the rest of the optical fiber, and the temperature being measured thus is the temperature at the end surface of the optical fiber. The radiation transmitted by the optical fiber to the detector bears a corresponding relationship to the weld temperature.

Pressing one end of the optical fiber directly against the surface of the material being heated reduces the error resulting from variations in weld material emissivity and eliminates the problem of radiant energy reflected from the surface of the material being welded. A test was performed to determine if the intensity of the transmitted energy would vary with changes in the emissivity of the weld material. The emissivity of a buss wire was altered by painting the surface of the wire black in the area contacted by the end of the optical fiber. The wire was welded and the intensity reading and weld parameters were recorded. Another sample of the same buss wire material was cleaned and polished in the surface area contacted by the end of the optical fiber. This second sample was welded using the same weld parameters as used with the first sample. There was no observable difference in the reading obtained with the second sample from that obtained with the first sample. This independence of surface emissivity indicates that the end of the optical fiber contacting the surface of the material being welded is heated up to the temperature of the weld and emits radiation which corresponds in intensity to the temperature of the weld.

Making the optical fiber and detector a part of an additive welding electrode eliminates many of the difficulties discussed previously, such as the difficulty of positioning the optical element in the weld area, interference of foreign objects in the field of view, and interference with operation and maintenance of the welding apparatus. The optical fiber wears away at substantially the same rate as the welding surface of the electrode so it always remains in "focus" on the surface of the material being welded. Since the optical fiber transmits radiation by use of the principle of total internal reflection, there is very little energy lost due to attenuation.

FIG. 10 shows an optical fiber 101 and detector 102 installed on an electrode 100 of a type which is commonly used in parallel gap welding. Optical fiber 101 is cemented to one side of the electrode which locates it between the pair of parallel gap electrodes, because the material being welded is heated in the area that spans or bridges the pair of parallel gap electrodes. Detector 102 is bonded to the top surface of the electrode and the two electrical leads 103 and 104 are connected electrically to a measuring circuit, such as the one shown in FIG. 4 of this application. A commercially available epoxy cement may be used to bond the fiber 101 and detector 102 to electrode 100. An alternative embodiment in the case of the parallel gap electrode 100 shown in FIG. 10 is to have a parallel array of optical fibers cemented to the side of the electrode adjacent to the optical fiber 101 shown in FIG. 10. This parallel array of fibers would all transmit to the same detector and the corresponding electrical signal produced by the detector would be an integrated measurement of the radiation signals received from the parallel bundle of fibers.

FIG. 11 and FIG. 12 show two of the L-shaped electrodes commonly found in production welding. These electrodes have the characteristic spring that causes the material being welded to move out of focus when using a conventional optical lens system to measure weld temperature. FIG. 11 and FIG. 12 demonstrate the ease of bending the optical fiber to conform to structural contours.

FIG. 11 shows an L-shaped electrode 200 with an optical fiber 201 installed in a bore which is perpendicular to the welding surface 207 of the electrode. Optical fiber 201 exits from the bore at the bend 208 of the electrode and terminates adjacent a detector 204. The end of fiber 201 and the detector are attached and held in position on electrode 200 with any suitable commercially available potting compound 205. Electrical leads 203 and 204 are connected to a measuring circuit such as shown in FIG. 4, for example.

FIG. 12 shows an L-shaped electrode 300 with an optical fiber 301 installed in a bore which is perpendicular to welding surface 307. Optical fiber 301 exits from the bore at the first bend from the welding surface and terminates adjacent a detector 302, the end of optical fiber 301 and the detector being held in position and attached to the surface of electrode 300 with any suitable commercially available potted compound 305. Electrical leads 303 and 304 are connected to a measuring circuit such as shown in FIG. 4, for example.

Various embodiments of this invention have been utilized with the circuit shown in FIG. 4. The electrical display unit 46 of FIG. 4 was an oscilloscope and the signal traces observed were read as radiance vs. time. Typical traces of the measurements observed are shown in FIGS. 13, 14 and 15. FIG. 13 shows a typical trace of a cold weld that is rejectable for insufficient bonding. FIG. 14 shows a typical trace of an acceptable weld. FIG. 15 shows a typical trace of a hot weld that would be rejected for reduced cross-sectional area. These measurements were correlated with micro-photographs of the welds and with destructive analysis.

From the foregoing, it will be apparent that a novel temperature measuring device has been achieved in accordance with the objectives of this invention. The invention is not to be construed as being restricted to use with welding apparatus since it may be used in any application where the temperature of the heated material is high enough to degrade the optical properties at the adjacent end of an optical conduit so that the adjacent end itself becomes the emitter of radiation having an intensity that corresponds to the temperature of the heated material being measured. Other suggested applications of this invention are the use of optical conduits to measure the temperature of ovens or other heated chambers or the temperature at the end of exhaust pipes or smokestacks.

It is to be understood that various modifications and changes may be made by those skilled in the art such as the use of incoherent bundles of optical fibers wherein the number, diameter and length of the fibers will depend upon the particular application. Such modifications or changes are not to be considered as departing from the spirit of the invention as expressed in the accompanying claims.

We claim:

1. A temperature measuring apparatus for determining the temperature of a heat source substantially independently of the surface reflectivity thereof comprising:
   detection means in spaced relation with said heat source for producing a measurable signal in response to impinging radiant energy,
   and a radiation conduit having one end directed toward said detection means, the opposite end thereof being optically degraded whereby said opposite end assumes a temperature which is directly related to that of the heat source during operation of the apparatus and consequently becomes itself a source of thermal radiation for transmission through the conduit to said detection means.

2. A temperature measuring apparatus for determining the temperature of radiant energy emitted by heated material substantially independently of hte surface reflectivity thereof comprising:
   an optical fiber element having one end adapted to be positioned adjacent said heated material, said one end of the fiber element being optically degraded whereby it assumes a temperature which is directly related to that of said heated material and consequently becomes itself a generator of radiant energy, said element further having a transmitting portion for conducting radiant energy from said one end to the opposite end thereof,
   radiant energy detection means disposed to receive radiant energy from said one end of the element for producing an electrical signal corresponding to the intensity of the radiant energy it receives,
   and circuit means connected electrically to said radiation detection means for measuring said electrical signal and displaying the resultant measurement in units corresponding to the temperature of the heated material.

3. A welding apparatus for determining the temperature of radiant energy emitted by a weld substantially independently of the surface reflectivity thereof comprising:
   a welding electrode having means at one end for location adjacent material to be welded and for creating a weld the temperature of which is to be measured,
   infra-red radiation detecting means spaced from said one end of the electrode, and
   an infra-red radiation transmitting optical fiber element having one end directed toward said detecting means, the opposite end thereof being optically degraded whereby said opposite end assumes a temperature which is directly related to that of a weld during a welding operation and consequently becomes itself a source of thermal radiation for transmission to said detecting means.

4. A welding apparatus as set forth in claim 3 wherein said optical fiber element is mounted on said electrode.

5. A welding apparatus as set forth in claim 3 wherein said electrode is elongated and said optical fiber element is mounted thereon and extends longitudinally thereof.

6. A welding apparatus as set forth in claim 3 wherein said optical fiber element comprises glass material.

7. A welding apparatus as set forth in claim 3 wherein said optical fiber element is comprised of a plastic material wherein said opposite end comprises charred carbon.

8. A welding apparatus for determining the temperature of radiant energy emitted by a weld substantially independently of the surface reflectivity thereof comprising:
   holding means including a pair of clamping members,
   a welding electrode supported by at least one of said clamping members and having one end adapted to be located adjacent said weld,
   infra-red radiation detecting means supported by said holding means and spaced from said one end of the electrode for producing an electrical signal corresponding to an impinging radiation signal,
   an infra-red radiaiton transmitting optical fiber element supported by said electrode, having one end directed toward said detecting means, the opposite end thereof being optically degraded whereby said opposite end assumes a temperature which is directly related to that of a weld during a welding operation and consequently becomes itself a source of thermal radiation for transmission to said detecting means, and
   circuit means connected electrically to said radiation detecting means for measuring the electrical signal formed thereby upon detection of an impinging radiation signal passing through said element from said opposite end thereof and displaying the resultant measurement in units corresponding to the temperature of the weld.

9. A welding apparatus as set forth in claim 8 wherein said electrode is elongated and said optical fiber element is mounted thereon and extends longitudinally thereof.

10. A welding apparatus as set forth in claim 8 wherein said optical fiber element comprises glass material.

11. A welding apparatus as set forth in claim 8 wherein said optical fiber element is comprised of a plastic material wherein said opposite end comprises charred carbon.

12. A welding apparatus for determining the temperature of radiant energy emitted by a weld substantially independently of the surface reflectivity thereof comprising:
first and second electrodes each including a welding end having a welding surface,
infra-red radiation detecting means supported by said first electrode for producing an electrical signal corresponding to an impinging radiation signal, and
an infra-red radiation transmitting optical fiber element supported by said first electrode having one end directed toward said detecting means, the opposite end thereof being optically degraded whereby said opposite end assumes a temperature which is directly related to that of a weld during a welding operation and consequently becomes itself a source of thermal radiation for transmission to said detecting means.

13. A welding apparatus for determining the temperature of radiant energy emitted by a weld substantially independently of the surface reflectivity thereof comprising:
first and second electrodes each including a welding end having a welding surface,
infra-red radiation detecting means supported by said first electrode for producing an electrical signal corresponding to an impinging radiation signal,
an infra-red radiation transmitting optical fiber element supported by said first electrode having one end directed toward said detecting means, the opposite end thereof being optically degraded whereby said opposite end assumes a temperature which is directly related to that of a weld during a welding operation and consequently itself becomes a source of thermal radiation, and
circuit means connected electrically to said radiation detecting means for measuring the electrical signal formed by the detecting means upon detection of an impinging radiation signal passing through said element from said opposite end thereof and displaying the resultant measurement in units corresponding to the temperature of the weld.

14. A welding apparatus as set forth in claim 13 wherein said welding ends of said electrodes are longitudinally aligned with said welding surfaces being disposed in adjacent spaced relationship.

15. A welding apparatus as set forth in claim 13 wherein said welding ends of said electrodes are parallel and said welding surfaces thereof are disposed in a common plane.

16. A welding apparatus as set forth in claim 13 wherein said first electrode has a bore therethrough and said optical fiber element is mounted therein.

17. Temperature sensing apparatus comprising:
radiant energy detection means, and
a radiation conduit having one end directed toward said detection means, the opposite end of the conduit being at least partially degraded for absorbing radiant energy from a source when positioned adjacent thereto and for consequently becoming itself a source of thermal radiation of a temperature which is directly related to the temperature of said source when positioned adjacent thereto whereby said thermal radiation will be transmitted through the conduit to said detection means.

18. Temperature sensing apparatus as set forth in claim 17 wherein said opposite end is opaque to radiant energy from said source.

19. Temperature sensing apparatus comprising: radiant energy detection means, and a radiation conduit having one end directed toward said detection means and having its opposite end at least partially optically degraded for becoming a source of thermal radiation of a temperature which is directly related to the temperature of a heat source when positioned in proximity thereto whereby said thermal radiation will be transmitted through the conduit to said detection means.

References Cited

UNITED STATES PATENTS

| 3,262,006 | 7/1966 | Sciaky et al. | 314—63 |
| 3,236,997 | 2/1966 | Johnson et al. | 314—63 X |
| 3,354,287 | 11/1967 | Sennello et al. | 219—59 X |
| 3,370,151 | 2/1968 | Normando | 219—125 X |
| 3,406,272 | 10/1968 | Ehrlich | 219—109 |

FOREIGN PATENTS 117,130   4/1958   U.S.S.R.

JOSEPH V. TRUHE, Primary Examiner

J. G. SMITH, Assistant Examiner

U.S. Cl. X.R.

356—44